(12) United States Patent
Nadkarni

(10) Patent No.: US 9,807,118 B2
(45) Date of Patent: Oct. 31, 2017

(54) SECURITY ORCHESTRATION FRAMEWORK

(71) Applicant: McAfee, Inc., Santa Clara, CA (US)

(72) Inventor: Hemang Nadkarni, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/752,867

(22) Filed: Jun. 27, 2015

(65) Prior Publication Data
US 2016/0119379 A1    Apr. 28, 2016

Related U.S. Application Data

(60) Provisional application No. 62/068,727, filed on Oct. 26, 2014.

(51) Int. Cl.
  *H04L 29/00* (2006.01)
  *H04L 29/06* (2006.01)
  *G06F 21/62* (2013.01)

(52) U.S. Cl.
  CPC .......... *H04L 63/20* (2013.01); *G06F 21/6245* (2013.01); *H04L 63/145* (2013.01)

(58) Field of Classification Search
  CPC .............................. G06F 15/173; G06F 21/55
  USPC ........................................................ 726/1
  See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 6,697,857 | B1 * | 2/2004 | Dixon ............. H04L 63/164 709/202 |
| 7,506,155 | B1 | 3/2009 | Stewart et al. |
| 7,818,328 | B2 | 10/2010 | Bottger et al. |
| 8,015,604 | B1 | 9/2011 | Tidwell et al. |

(Continued)

FOREIGN PATENT DOCUMENTS

| WO | 2015047435 A1 | 4/2015 |
| WO | 2015048598 † | 4/2015 |

(Continued)

OTHER PUBLICATIONS

International Preliminary Report on Patentability issued in PCT Application No. PCT/US2015/052516 dated May 2, 2017; 10 pages.

(Continued)

*Primary Examiner* — Anthony Brown
*Assistant Examiner* — Michael D Anderson
(74) *Attorney, Agent, or Firm* — Patent Capital Group

(57) ABSTRACT

In an example, there is disclosed a computing apparatus, including: a network interface; one or more logic elements providing a security orchestration server engine operable for: receiving contextual data from a client via a network interface; providing the contextual data to a security orchestration state machine, the security orchestration state machine operable for deriving a policy decision from the contextual data; and receiving the policy decision from the policy orchestration state machine. There is also disclosed one or more tangible, non-transitory computer-readable mediums having stored thereon executable instructions for providing a security orchestration engine, and a method of providing a security orchestration engine.

20 Claims, 6 Drawing Sheets

(56) References Cited

U.S. PATENT DOCUMENTS

| | | |
|---|---|---|
| 8,201,257 B1 | 6/2012 | Andres et al. |
| 9,027,120 B1 | 5/2015 | Tidwell et al. |
| 2007/0192824 A1 | 8/2007 | Frank et al. |
| 2007/0198987 A1 | 8/2007 | Bottger et al. |
| 2007/0261055 A1 | 11/2007 | Kunjithapatham et al. |
| 2008/0069082 A1 | 3/2008 | Patrick |
| 2008/0155649 A1 | 6/2008 | Maler et al. |
| 2008/0209505 A1 | 8/2008 | Ghai et al. |
| 2008/0250097 A1 | 10/2008 | Angelini et al. |
| 2010/0057835 A1 | 3/2010 | Little |
| 2010/0080148 A1 | 4/2010 | Hulse et al. |
| 2010/0223239 A1 | 9/2010 | Madsen et al. |
| 2011/0113105 A1 | 5/2011 | Eckardt |
| 2011/0125821 A1 | 5/2011 | Roshen |
| 2011/0225650 A1 | 9/2011 | Margolies et al. |
| 2011/0288692 A1 | 11/2011 | Scott |
| 2011/0302254 A1 | 12/2011 | Yu |
| 2013/0055385 A1 | 2/2013 | Antony et al. |
| 2013/0074143 A1 | 3/2013 | Bu et al. |
| 2013/0091293 A1 | 4/2013 | Roshen |
| 2013/0111599 A1 | 5/2013 | Gargiulo |
| 2013/0205392 A1 | 8/2013 | MacWan et al. |
| 2013/0326210 A1 | 12/2013 | Gluck |
| 2014/0007238 A1 | 1/2014 | Magee et al. |
| 2015/0135258 A1 | 5/2015 | Smith et al. |
| 2015/0207809 A1 | 7/2015 | Macaulay |
| 2016/0070908 A1* | 3/2016 | Sanghvi ................ G06F 21/554 726/23 |
| 2016/0205143 A1 | 7/2016 | Bryson et al. |
| 2016/0212228 A1 | 7/2016 | Arkin |

FOREIGN PATENT DOCUMENTS

| | | | |
|---|---|---|---|
| WO | 2015048599 | † | 4/2015 |
| WO | 2016069158 A1 | | 5/2016 |

OTHER PUBLICATIONS

PCT International Search Report and Written Opinion in International Application No. PCT/US2015/052516 dated Jan. 12, 2016.
UPSTO Non-Final Office Action issued in U.S. Appl. No. 14/912,750 dated Jul. 13, 2017; 33 pages.

* cited by examiner
† cited by third party

SECURITY ORCHESTRATION FRAMEWORK

CROSS REFERENCE TO RELATED APPLICATIONS

This Application claims priority to U.S. Provisional Application 62/068,727, titled "Security Orchestration Framework," filed Oct. 26, 2014, which is incorporated herein by reference.

FIELD OF THE SPECIFICATION

This disclosure relates in general to the field of computer security, and more particularly, though not exclusively to, a system and method for providing a security orchestration framework.

BACKGROUND

Traditional security frameworks provide a plurality of resources, such as files and devices, and define a set of users or groups with certain permissions related to those resources. For example, user "joe" may belong to group "users" on a system, such as a Unix-workalike or a Windows-based system. Joe may have both read and write access to his "home" directory, and as a member of the group "users," may also have read-only access to certain system resources such as system drivers.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
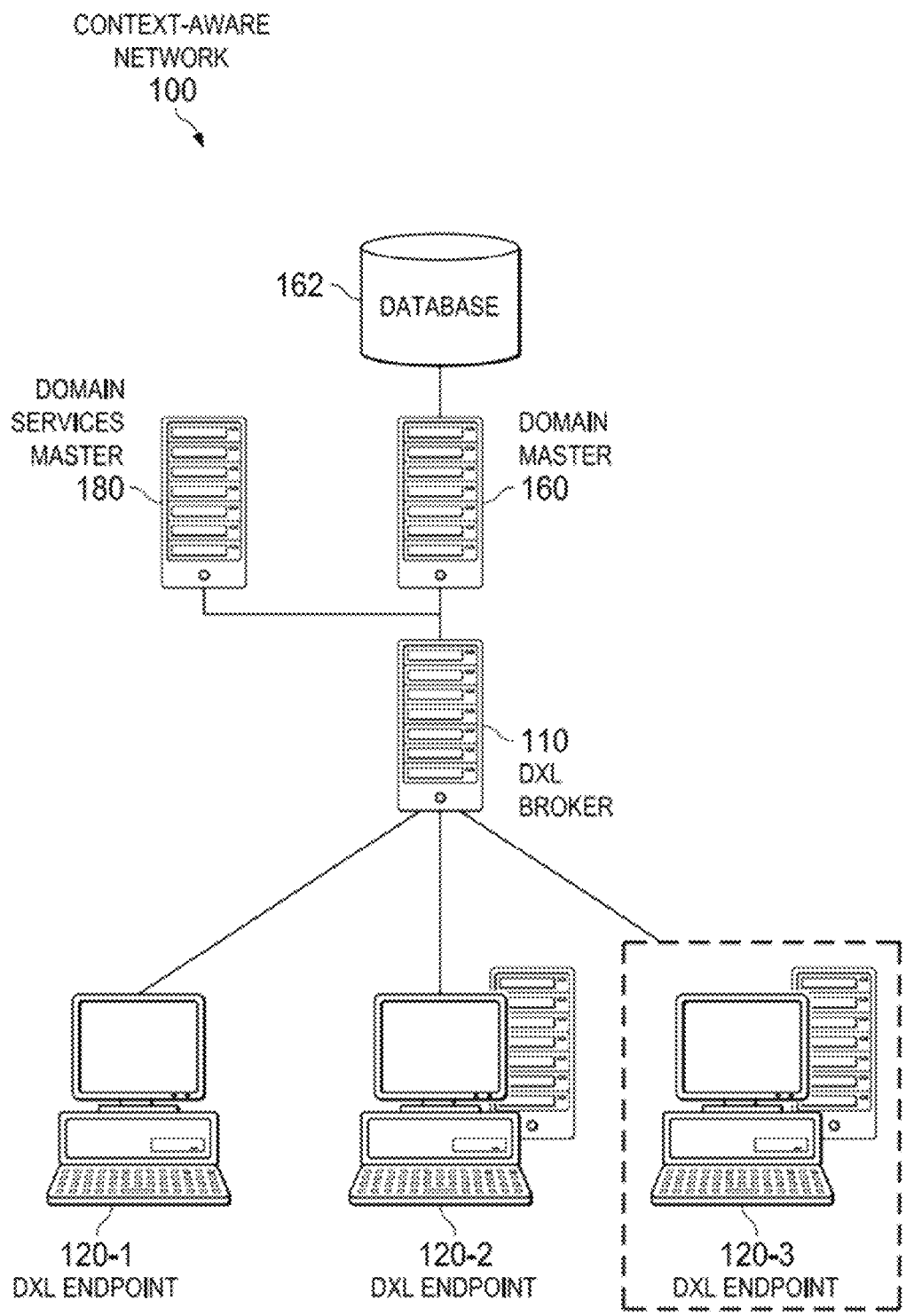
FIG. 1 is a block diagram of a context-aware network according to one or more examples of the present Specification.

In an example, there is disclosed a computing apparatus, including: a network interface; one or more logic elements providing a security orchestration server engine operable for: receiving contextual data from a client via a network interface; providing the contextual data to a security orchestration state machine, the security orchestration state machine operable for deriving a policy decision from the contextual data; and receiving the policy decision from the policy orchestration state machine. There is also disclosed one or more tangible, non-transitory computer-readable mediums having stored thereon executable instructions for providing a security orchestration engine, and a method of providing a security orchestration engine.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

Computer security is a defining issue of the information age. Over time, computer security has become a virtual arms race between malicious actors on the one hand, and security personnel on the other hand. As security personnel develop new security techniques to defeat malicious actors, malicious actors adapt as quickly as they are able to defeat the new security mechanisms.

Context-aware policies are a powerful arrow in the quiver of the security personnel. In a context aware policy, a user is not simply granted access to a resource en grosse, or conversely denied access to the resource en grosse, but rather a set of highly granular policies can be defined for each resource based on the user's context and strength of authentication.

This system addresses the reality of a world in which users are increasingly accessing enterprise services and resources via portable devices, often in a "bring your own device" (BYOD) model, in which users are permitted and possibly even encouraged to provide their own mobile devices. Thus, even if enterprise applications and data are well secured within a data center, the level of security may vary wildly on client devices. Client devices and users may thus be easy targets of attack, for example via social engineering, zero-day exploits, and similar. Moreover, devices often remain connected to privileged service (such as email, sensitive document shares, and code repositories), or have sensitive data downloaded onto them, even when the user is not actively performing enterprise tasks. Once data or resources are resident on the client device, an attacker may acquire the de facto privileges of the user by compromising the device.

For example, it may be desirable to grant an authorized user full access to particularly sensitive documents while she is physically within an office space controlled by the enterprise. Once that user leaves the physical office space, it may still be desirable to permit her to read and review the document, but not make changes to it. This difference in policy reflects the relative security features of the two different locations. Strength of authentication may also form a context that can usefully inform decisions about what permissions to grant. For example, if a user authenticates via a week authentication mechanism, such as single factor authentication like a username and password, it may be desirable to restrict or limit that user as compared to a user who has authenticated with a stronger mechanism, such as two-factor authentication. Furthermore, even within types of authentication, relative strengths may be recognized. For example, some security researchers recognize a fingerprint as relatively weak biometric authentication mechanism. On the other hand, a retinal scan may be recognized as a much stronger biometric authentication method, because it is much harder to spoof. Thus, it may be desirable, for example, to place additional restrictions on a user authenticating via a fingerprint relative to a user authenticating via retinal scan.

Context can also include many other environmental factors. For example, context may include the presence of a smart badge or other RFID device near a computing device, the user's physical location, the presence of more than one individual with in a room or facility, whether a user is stationary or in motion, the user's position within an organization or hierarchy, availability of other's within the organization, a universally unique identifier (UUID) of a device the user is operating, real-time medical telemetry (such as pulse and perspiration, for example), and any other suitable environmental factor that may bear on a user's reliability or permission to access certain resources.

In some examples, heuristics may also play a part in context aware policies. For example, a user's daily habits may increase the probability that a user is authentic. For example, if a user habitually logs in at home in the morning to check her email, then leaves home and goes to a nearby diner for breakfast, and works on files while at breakfast via her laptop, and if she then habitually goes into work at approximately 9 AM, this pattern may be imprinted as heuristic data that can increase confidence as the user follows the pattern, or decrease confidence as the user varies from the pattern. If the user varies her pattern, additional authentication tokens may be required before she is permitted to access certain resources. If the user consistently varies the pattern, thus making a new habit, then the new habit can also be imprinted heuristically.

In another example, and a user's calendar may be contextually correlated with other data to increase or decrease confidence. For example, the user is scheduled for a meeting in a conference room at 10:30, and logs in from within conference room a at 10:35. This may reflect a relatively high confidence that the user is authentic. Similarly, if the user is normally based in Los Angeles, her attempt to login from a coffeehouse in Seattle may be relatively suspicious. However, if according to her calendar the user is scheduled to be in Seattle that week on business travel, then the attempt to login from Seattle may be relatively less suspicious. Similarly, an attempt to login from a corporate branch in Seattle may be less suspicious than an attempt to login from a coffee house.

Many other examples of context, and the effect of a particular context on authentication and resource availability and usage are possible. The scope of the present specification is not intended to be limited to any particular context, or any particular permission scheme related to the context.

One issue that arises in contextual computing is the need to constantly define new contexts, and to integrate additional sensors and resources into a context aware policy. Thus, it is desirable to define a framework to allow administrators to seamlessly implement and deeply context-aware security policies. With such a framework in place, the administrator's task is greatly eased, because policies can be defined in terms of what they do rather than the details of how to do them.

The operating principle can be summarized as follows:
a. Each security control (or sensor) may be provided with a context-sensing capability, a policy-decision capability, and policy-enforcement capability. (The last two are optional for sensors.) In an e example, a control operates on its own, performing the respective functions in that order.
b. The three functions are logically independent on each control, allowing them to be invoked independently, for example via an application programming interface (API).
c. Multiple controls can be connected and deployed at diverse locations, with distinct types of visibility and control. In an example, a data exchange layer (DXL) provides a fabric so that the various controls can operate as a unified system. Such a system essentially acts as a super-control, having the combined sensing, decision, and enforcement capabilities of individual elemental controls.

This enables an arbitrary number of otherwise independent security controls to be forged into a unified system with capabilities far greater than the sum of its parts. The policy decision logic may be extracted away from individual controls and centralized, if not fully at least to the extent necessary, to deliver the following advantages:
a. Enabling additional, ad-hoc, smart logic, intelligence, and analytics to be injected into the real-time policy decision.
b. Enabling the overall decision logic to capture context and drive actions staggered over multiple points in space and time.

Certain embodiments may provide selected features of a software-defined network (SDN), where the networking control plane is logically separated from the data plane, and centralized. This allows for sophisticated network policies to be applied over a broad network, while leveraging commodity switching infrastructure. Stated differently, policy sensing may be distributed to individual devices, which may ensure that sensing occurs in the right sequence. Policy decisions can be aggregated centrally so that individual devices need not make important policy decisions in a vacuum—rather, the central server has the necessary visibility to see the entire context. Finally, enforcement may be provided on both the server and the end device, according to the needs of a particular implementation.

This allows a network administrator, for example, to define a policy in terms of a given context, a required authentication level, and granular access rights based on the foregoing. For example, an administrator may define 5 authentication levels, with 1 being the lowest (weak authentication), and 5 being the highest (very strong authentication). For any given context, the administrator may identify a granular set of access policies, based on the authentication level.

Advantageously, using the architecture of the present specification, the administrator need not concern himself with how the context is derived, or the specific authentication method used. For example, context may be derived from GPS, a device's UUID, wireless or cellular networks, or any other suitable context sensor. Similarly, authentication may be provided via any suitable means, such as password, RFID token, biometric authentication, one-time key, or two-factor authentication, by way of non-limiting example. Based on the context and the strength of authentication, the server may decide what permissions to grant, and the server and user device may jointly enforce the policy.

However, if a sensor or device acquires new capabilities, there is no corresponding need to update the contextual security policy. For example, if a device that previously only provided fingerprint authentication (level 3, in an example) later acquires retinal scan capabilities (level 5, in an example), the policy can remain in place because the policy does not concern itself with how the authentication level was achieved, but only with what level is achieved. Similarly, if a device has retinal scan capabilities, but later acquires a new, cutting-edge authentication technology that is at least as strong, there is similarly no need to update the policy. Rather, the new technology need only be assigned an "authentication level" value of 5. If the new technology is even better than retinal scan, a new level "6" may be defined. In that case, authentication via the new method will be effective for any policy that provides for an authentication level greater than or equal to 5.

Certain existing approaches, in contrast, rely on a set of endpoint security controls that independently look for known-bad elements. However, each control only has a limited view of the user's overall task context. This allows for targeted attackers to evade endpoint controls via out-of-context privilege abuse, since controls cannot distinguish abuse from legitimate user action.

To address limitations of certain existing architectures, the present specification describes a novel architecture in which a generic security orchestration framework enables ad-hoc, context-aware policy criteria to be applied continuously and in real-time, by using an ecosystem of (otherwise independent) security controls connected via DXL. Policies may be enforced using the best set of controls from those available in a given environment. The framework overcomes certain limitations of individual controls by enabling the coverage of contexts and actions that span multiple points in space and time.

The scheme also allows the use of a "graduated" security approach (in contrast to one-size-fits-all security) that balances strong security concerns with productivity needs: Privileges granted to a client device/app/user can be dynamically aligned with the trustworthiness of the context/environment.

The contextual security teachings of this specification can be realized, in one example, in a context-aware network operating on or with a data exchange layer (DXL). Context-Aware Computing (CAC) is a style of computing in which situational and environmental information about people, places and things is used to anticipate immediate needs and proactively offer enriched, situation-aware, and usable functions and experiences. Context-aware computing relies on capturing data about the world as it is at the moment the system is running.

According to one or more examples of the present Specification, a "context-aware network" is an adaptive system, including for example a security system, of interconnected services that communicate and share information to make real-time, accurate decisions by individual products and/or as a collective. According to an example, network, endpoint, database, application and other security solutions are no longer to operate as separate "silos" but as one synchronized, real-time, context-aware and adaptive, security system.

In an example, multiple network elements are connected to one another via a DXL, which is a type of enterprise service bus (ESB) that is suitable for exchange of security-related messages among other things. As used herein, "network elements" include any type of client or server (e.g., a video server, a web server, etc.), routers, switches, gateways, bridges, load-balancers, firewalls, inline service nodes, proxies, network appliances, processors, modules, or any other suitable device, component, element, or object operable to exchange information in a network environment. More specifically, DXL endpoints are network elements that interact over a DXL ESB. DXL endpoints may be distributed across a customer network and communicate in "real-time" in a trusted, secure, and reliable fashion. This may provide increased automation and improved security services.

In an example, DXL endpoints are deployed at strategic locations within a network to intercept ongoing business activity, inspect and interpret it, and ultimately determine whether it is authorized; meaning for example that it is consistent with enterprise security policies. In some cases, network elements must make such decisions "in-band," momentarily suspending the business activity, and in "machine-real-time," at latencies low enough to avoid a significant user-perceptible delay in the business activity.

In some cases, network elements may have independent access to security data only by way of their own independent analysis and observation, and via scheduled definition updates, which may come, for example, on a weekly basis as updated malware definition.

Because network elements are often heterogeneous and may be deployed, particularly in a modern network, in a temporary or ad hoc fashion, real-time intelligence becomes a challenge, particularly when "in-band" decisions are necessary. Furthermore, an enterprise may procure security solutions in a piecemeal fashion, so that one product cannot always assume the presence of another product. For example, there may not be a single, pre-defined repository of threat intelligence for network elements to consult, and regular malware definition updates may not include lately discovered threats. Representation and interpretation of data offer yet another challenge. Network elements may use disparate, proprietary data representations. Thus, for example, even an antivirus scanner may not be configured to share newly discovered malware information with a network-based security device. Trustworthiness of information may be yet another challenge in other contexts. In other words, even if an antivirus scanner and network-based security device are configured to share security intelligence, each may not have a means of validating intelligence received from the other.

In an example, the present Specification provides a data exchange layer (DXL), which may operate on a lightweight messaging-based communications infrastructure such as ESB and be configured to allow endpoints to share contextual data. DXL may be one element of a larger security-connected framework, which is an adaptive system, such as a security system, of interconnected services that communicate and share information to make real-time, accurate security decisions by individual security products and/or as a collective. According to an example, network, endpoint, database, application and other security solutions need not operate as separate 'silos' but as one synchronized, real-time, context-aware and adaptive security system.

The DXL is built on top of messaging technology, such as an ESB, which enables multiple different use cases and capabilities (context-aware and adaptive security by sharing context between multiple different products allowing for security components to operate as one to immediately share relevant data between endpoint, gateway, and other security products enabling security intelligence and adaptive security (immediately change behavior according to information you are getting); superior command and control of endpoints and many other use cases).

These advantageous abilities are enabled by the use of ESB messaging for security and management purposes. DXL messaging enable real-time, bi-directional communications infrastructure allowing products and solutions to integrate with each other using a single application programming interface (API). Each device may share essentially any data it likes over the DXL fabric, while the devices themselves are only loosely coupled, and need not operate on common or standardized protocols.

Examples of DXL message types include publish-subscribe notifications, query-response, and push notification. Devices may also share events, including security-related events, contextual information (about the node, the identity of its user, the applications used, the location for which they are found, etc.), commands, tasks, and policies, by way of non-limiting example.

In a first example of a security-connected framework, messaging technologies are used to maintain and enhance enterprise security. Security information shared over the security-connected framework may comprise more than just context, and may also comprise commands, tasks, policies and software updates by way of non-limiting example. Thus, with a security-connected framework, the infrastructure is able to function as a command and control management infrastructure. The infrastructure may also be used with security management software (SMS), such as McAfee® ePolicyOrchestrator. The SMS may connect to the DXL ESB, enabling the SMS to provide command and control functions across an entire network.

Messaging enables integration between products in a loosely coupled manner lowering the amount of assumptions two, or more, products makes about each other in order to integrate. The present implementation uses a single API embedded with the McAfee Agent and provided as a software library.

The security-connected framework of the present Specification also addresses issues of control over the status of operational security. Certain existing security management solutions are unable to initiate communications at-will with managed devices that sit, for example, on the other side of a network address translation (NAT) boundary. The challenge may become more complicated with changing business needs such as cloud, mobilization, and consumerization by way of non-limiting example.

In these cases, managed devices may initiate communication at unpredictable times, leaving open a window during which the enterprise is exposed to increased risk from its inability to immediately push policy changes, content deployments, and program updates to all nodes.

In one example of this challenge, orchestration of security defenses is needed as an immediate reaction to a security event. As used throughout this Specification, a "security event" includes any event on a device or a network that has substantial ramifications for personal and/or enterprise security. Non-limiting examples of security events include actual or potential intrusion events, user or device authentication events, audit events, malware incidents, anti-malware updates, user or device reputation updates, physical intrusion events, data loss, import of substantial or significant data, or changes in enterprise security policies.

In a second example of a security-connected framework, a real-time, bi-directional communications fabric is provided for enabling real-time security management. Specifically, certain existing messaging infrastructures are based on one-to-many communications (publish-subscribe). In this example of the present Specification, the publish-subscribe capabilities are significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

As used throughout this Specification, a "DXL message" includes any message communicated over a DXL ESB. Each DXL message includes at least one "topic"; a topic, representing a subject of the message. Topics may include, threat intelligence, context, and events by way of non-limiting example.

By design, each DXL endpoint is configured to subscribe to at least one DXL message topic (at a minimum, a private destination topic for routing DXL messages to that DXL endpoint). This enables bi-directional communications, over the DXL, between a management platform, for example, and one or more of its managed clients.

In a third example of a security-connected platform, push notification messaging may be used to increase efficiency and to decrease unnecessary network traffic. Certain existing push notification messaging systems send one notification per system, making it inefficient to send the same message to multiple different systems when they are not subscribed to the same message topic.

However, in the present example, when push notifications are sent, aggregation occurs on a per-location basis, with a single push notification the message is sent to a remote location. The message includes a marking, such as a header attribute, that determines which clients are to receive the notification. A local DXL broker then inspects the notification and splits the message into n notifications, which it delivers locally to all relevant targets. Thus, for example, where a DXL broker is connected to six client devices that all subscribe to their own private topics, only one copy of the message needs to go out over the network. The DXL broker then determines which six of its clients are to receive this message according to the header of the push notification, and delivers the message to those six clients. This significantly enhances the efficiency of sending push notifications of the same kind to a large number of clients when those clients are not subscribed to the same messages, subscribe to their own private topics, or subscribe to different topics.

Figure 2:
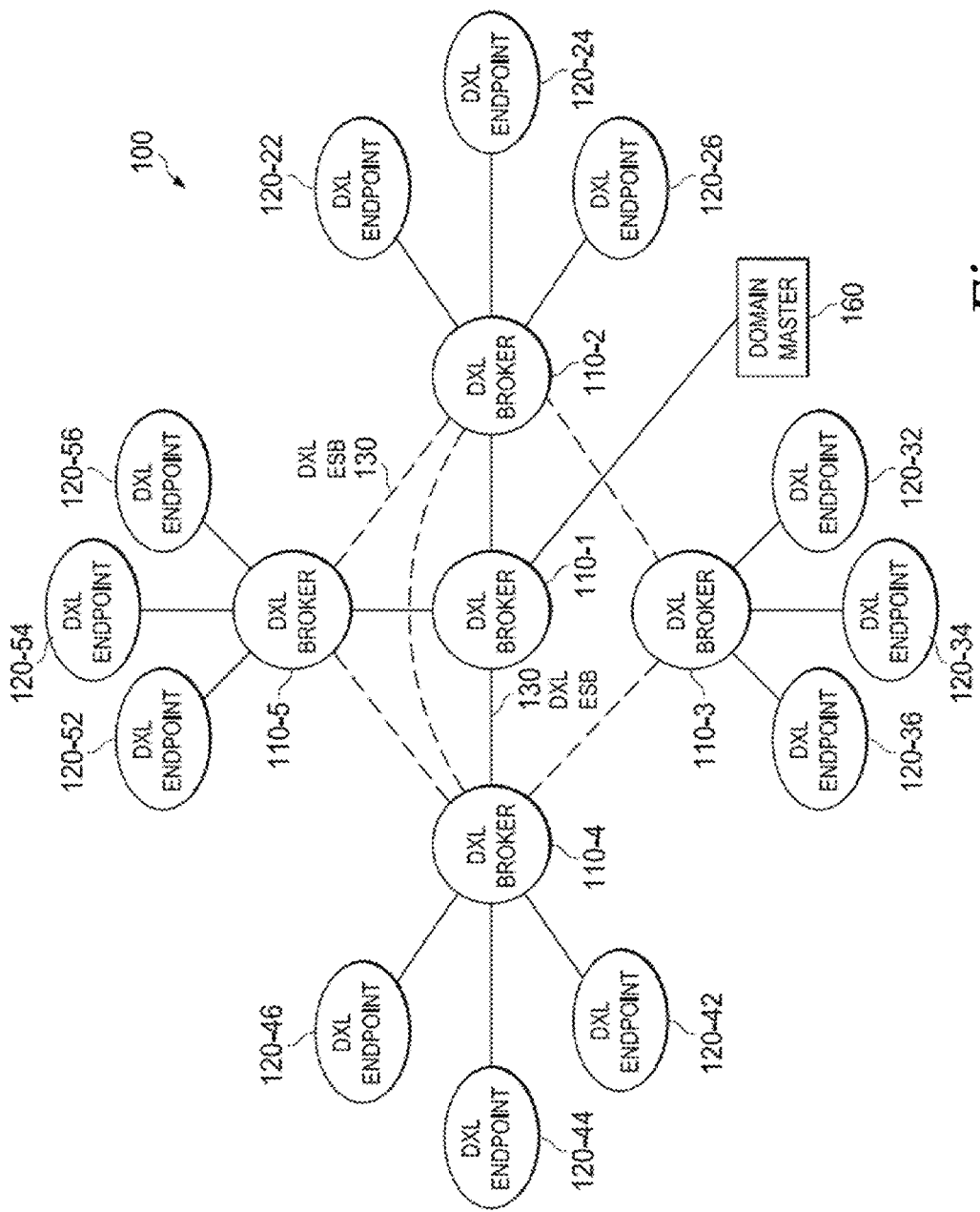
FIG. 2 is a block diagram of a data exchange layer (DXL) according to one or more examples of the present Specification.

FIG. 1 is a network-level block diagram of a context-aware network 100 with DXL capability. According to this example, a plurality of DXL endpoints 120 is connected to a DXL enterprise service bus (ESB) 130 (FIG. 2). DXL ESB 130 is an example of a DXL fabric, and may be provided on top of an existing network, such as a local area network (LAN). DXL ESB 130 need not be a particular physical bus, or even reside on a physical network. Rather, DXL ESB 130 may span multiple physical network and subnetworks. Conceptually, DXL ESB 130 is simply the "fabric" over which DXL endpoints 120 share DXL messages, wherein each DXL message includes a topic, and only DXL endpoints 120 that subscribe to that topic receive and/or act on messages for that topic. Advantageously, DXL ESB can extend even to non-trusted or unsecured networks so long as the DXL endpoints 120 themselves are trusted and can be sufficiently authenticated. Thus, for example, a remote user operating a DXL endpoint 120 at a coffee shop may still be able to send and receive DXL messages via his enterprise's DXL ESB 130, so long as the DXL endpoint 120 can be authenticated. In some cases, a DXL endpoint's network location may affect whether the DXL endpoint 120 is more trusted or less trusted for certain message topics.

DXL endpoint 120 may be any suitable computing device. In the example of FIG. 1, DXL endpoints are generically represented as computing devices. In one example, DXL endpoint 120-1 may be an embedded device, such as a network security sensor. DXL endpoint 120-2 may be a virtual machine. DXL endpoint 120-3 may be a laptop or notebook computer. It should also be noted that DXL endpoints are not limited to end-user or client devices. For example, domain master 160 and domain security controller (DSC) 180 may also have DXL client engines that enable them to function as DXL endpoints. Indeed, a major benefit of the DXL architecture is that servers and clients may exchange messages while being only loosely coupled, and remaining agnostic of each other's communication protocols and details.

DXL ESB 130 may be any type of physical or virtual network connection over which appropriate data may pass. At present, there is no fixed or global standard for an ESB, and the term, as used herein, is intended broadly to encompass any network technology or topology suitable for message exchange. In one embodiment, message queuing telemetry transport (MQTT) messages are exchanged on port 8883. In this example, domain master 160 and DSC 180 may be considered special cases of DXL endpoints 120. Other network elements may include a joint threat intelligence (JTI) server, default gateway, proxy, and threat intelligence service. Any network element may join DXL ESB 130 as a DXL endpoint.

Network elements configured to operate on or with DXL ESB 130 may be referred to as "DXL endpoints." These may include, in an example, DXL endpoints 120, DXL broker 110, and domain master 160.

DXL broker 110 may be configured to provide DXL messaging services over DXL ESB 130, such as maintaining DXL routing tables and delivering messages.

Domain master 160 may be configured to communicatively couple to DXL broker 130. Domain master 160 may maintain domain data in a database such as database 162. In this example, domain master 160 and database 162 are shown as two distinct entities, but it should be noted that many configurations are possible. For example, database 162 may reside on a disk drive local to the domain master 160, or may be separately or remotely hosted. Database 162 is disclosed by way of example, and may be any suitable data store, including a structured or relational database, distributed database, or flat file by way of non-limiting example.

DSC 180 may be configured to provide domain services, such as auxiliary and support services, antivirus services, and/or command and control services. DSC 180 may include security management software (SMS), which may provide network command and control functions.

By way of operative example, a client such as laptop 120-3 connects to the LAN and receives a new IP address. At this point, several properties of laptop 120-3 become knowable to other network elements, including by way of non-limiting example, its IP address, information about its operating system, and the logged-on user's username. For ease of reference, these are referred to as "client properties" throughout this example. Client properties are embodiments of security-intelligence data, and are of interest to virtual machine 120-2, which has previously subscribed to the security-intelligence data topic with domain master 160.

Client properties may be reported to the DXL simultaneously by two distinct sources, namely by laptop 120-3, and by network security sensor 120-1. However, network security sensor 120-1 may fail to report a username value. It may also report an OS value different from that reported by the laptop 120-3. This may be, for example, because network security sensor 120-1 is sensing data remotely, and may not be able to determine these values as reliably as laptop 120-3 itself.

Domain master 160 is responsible for the "client system" data domain, which includes client properties. When laptop 120-3 and DXL endpoint 120-1 publish a message containing the client properties, both messages are first routed to DXL broker 110. DXL broker 110 may then forward the client properties to domain master 160.

Domain master 160 may combine and reconcile the client properties received from the two sources into a single record of truth, containing a single value for IP address, operating system, and username respectively. Specifically, it may determine via its own logic, and perhaps prior configuration, that laptop 120-3 is trusted more for OS value than network security sensor 120-1. Therefore, domain master 160 may ignore the "operating system" value received from network security sensor 120-1 when it conflicts with laptop 120-3.

The reconciled client properties are persistently stored in domain database 162. Domain master 160 may then publish the client properties on DXL ESB 130. DXL broker 110 may then forward the published message to virtual machine 120-2, which receives a singular and most accurate value for client properties. Note, however that this reconciliation process is optional. In some cases, domain master 160 may know that a particular DXL endpoint 120 is the "best" device for a particular message topic, and so will immediately consume a message from that DXL endpoint 120 without waiting for conflicting information.

Subsequently, DXL endpoint 120-4 may send a DXL request over DXL ESB 130, inquiring about the client properties for laptop 120-3. DXL broker 110 receives this request and automatically routes it to domain master 160. Domain master 160 retrieves the client properties from domain database 162 and sends a DXL response message, which DXL broker 110 receives and forwards to DXL endpoint 120-4. Note that while the "publish-subscribe" transactions in this example are one-to-many, the "request-response" transactions are one-to-one.

In some embodiments, DXL may be characterized by messaging that allows loose integration or coupling of multiple network elements. Loose coupling may reduce the assumptions each DXL endpoint must make about other DXL endpoints, such as the presence of certain capabilities, hardware, or software. According to one or more examples of the present Specification, DXL is a 'Plug-and-Play' API, and may facilitate context-aware and adaptive security by enabling context to be shared between products.

Further according to one or more examples of the present Specification, DXL is an elastic architecture with multiple deployment options and is highly scalable. DXL may also be designed with openness in mind and enable third-party integration.

DXL ESB 130 may be based on a two-layer protocol. The "bottom" layer is a secure, reliable, low-latency data transport fabric that connects diverse security elements as a mesh, or in a hub-and-spoke configuration. The "top" layer is an extensible data exchange framework that is configured to facilitate trustworthy data representation.

In an example, DXL endpoints connect to DXL ESB 130. Each DXL endpoint is assigned a distinct identity, and authenticates itself to DXL ESB 130 upon startup, for example via a certificate or other secure token. DXL endpoints may establish one-to-one communications via DXL ESB 130, for example by sending a DXL message addressed to a DXL endpoint with a specific identity. This enables DXL endpoints to communicate with each other without having to establish a point-to-point network connection. In an example, this is analogous to a person-to-person phone call.

In another example, DXL may provide a publish-subscribe framework in which certain DXL endpoints "subscribe" to messages of a certain type. When a DXL endpoint "publishes" a message of that type on DXL ESB 130, all subscribers may process the message, while non-subscribers may safely ignore it. In an example, this is analogous to a podcast subscription service. In yet another example, DXL may provide a request-response framework. In this case, one DXL endpoint may publish a request over DXL ESB 130. An appropriate DXL endpoint receiving the request may provide a response. Advantageously, the response may be used by more than just the DXL endpoint that originally published the request. For example, if a DXL endpoint 120 publishes a request for an object's reputation, a JTI server acting as a DXL endpoint 120 may respond by publishing the reputation. Thus, other DXL endpoints 120 that find instances of the object may benefit from the response. For example, DXL endpoints 120 may maintain a comprehensive cache of reputations published on the network. If a DXL endpoint 120 then newly encounters an object that is known on the network, DXL endpoint 120 already has an up-to-date reputation for the object.

DXL ESB 130 may be implemented using diverse software elements, patterns, and constructs suited to the specific infrastructure connecting the security elements. For instance, in a physical enterprise network, messaging middleware consisting of multiple interconnected message brokers may be deployed, where endpoints connect to the closest broker. In a virtual network infrastructure, the fabric may leverage hypervisor provided channels.

As noted above, DXL ESB 130 may be configured to provide real-time, trusted exchange of data among otherwise-autonomous, dynamically assembled DXL endpoints. Thus, in an example DXL ESB 130's conceptual framework may comprise two virtual components:

Broad collections of security-relevant data are categorized into "data domains." Each data domain is a closely related sub-collection of entities, attributes, and inter-relationships.

Domain master 160 is a data provider assigned ownership of data for each domain. Domain master 160 acts as an intermediate trusted data broker between first-hand sources of raw "intelligence" data, and data consumer endpoints such as DXL endpoints 120. Intelligence data may flow from data producer endpoints to the appropriate domain master 160, and then be relayed to data consumer endpoints such as DXL endpoints 120. Note that in this example, the concepts of "data producer" and "data consumer" are contextual roles, and not necessarily physical devices. A DXL endpoint 120 may be a data producer in one context and a data consumer in another context.

In an example, domain master 160 may establish first-hand trust relationships with data-provider endpoints. This enables it to gauge the quality (including accuracy and reliability) of data (such as reputation data) it receives from any particular source. When duplicate, piecemeal data is received from multiple (independent) sources, such as different DXL endpoints 120, domain master 160 may reconcile the data and resolve conflicts to derive a single best-known record of truth (such as, for example, a reputation) for each object. This ensures that DXL endpoints 120 receive consistent data.

Domain master 160 may also transform data into a well-understood, standardized representation. This representation may be published on DXL ESB 130, so that all DXL endpoints 120 receive usable data.

Advantageously, DXL endpoints do not need to know what device originated data, or make point-to-point connections to other DXL endpoints, even when one-to-one communication is necessary. Rather, DXL client software or DXL extensions enable a DXL endpoint to use its own local APIs for querying and receiving data. To increase network efficiency, DXL endpoints may cache received data locally, which data may be trusted until it is superseded by an authorized DXL message. For example, DXL endpoints 120 may subscribe to published reputations for objects. When an object reputation is received, either in response to a request-response transaction, or in a publish-subscribe model, DXL endpoint 120 may store the reputation in a local database. The reputation may be trusted until superseded, because DXL master 160 is configured to publish a reputation update whenever it receives an updated reputation. Thus, frequent individual data requests from DXL endpoints 120 become bulk data subscriptions, as published reputations are available to all DXL endpoints 120 that subscribe to reputations. Advantageously, this may reduce the latency of data exchanges.

In yet another example, DXL broker 110 provides a discovery and location service that informs DXL endpoints of the specific domain master 160 to which data query and subscription requests should be routed.

Advantageously, the example DXL architecture described herein is flexible. For example, individual data sources may connect and disconnect from the network without affecting data consumers. Domain master 160 may simply rely on whatever data sources are available. Furthermore, the framework makes no assumptions about the physical location or specifically how domain master 160 or domain endpoints are deployed or configured. So long as each network element provides valid DXL messaging, traffic is routed correctly.

In the example above, DXL master 160 is a logical singleton, but it should be noted that DXL master 160 might be implemented, for example, as a set of distributed service components, where each component services either a subset of the domain, or provides a local data replica of a service running elsewhere. Such configurations may enhance scale, performance, and reliability. This may also allow services to be transparently relocated.

Further advantageously, the DXL framework provided herein is extensible. For example, data about new entities and relationships may be provided simply by creating new data domains. New attributes and relationships for existing data domains may be provided simply by defining new message types for that domain.

In an example, domain master 160 has responsibility over the domain of malware data. To distinguish messages from the "malware" domain, such as network status and device maintenance, a namespace may be defined for each. For example, the reputation domain may use the "MALWARE" namespace, the network status domain may use the "STATUS" namespace, and the device maintenance domain may use the "MAINT" namespace. Thus, if domain master 160 is the master for the reputation domain, it knows to process messages within the malware namespace, and to ignore all others. This allows a designer for each domain to assign a set of messages without having to consult existing domains to avoid name collisions for messages.

For example, both the reputation domain and a device maintenance domain may have use for a message such as DOWNLOAD_UPDATES. In the case of the reputation domain, this message may be an instruction to retrieve updated definitions from JTI server 150. In the device maintenance domain, this may be an instruction to download operating system updates from a vendor.

DXL endpoints 120 may be configured to exchange data from several DXL domains and may subscribe to messages on both the reputation domain and the device maintenance domain. Thus, DXL endpoint 120-1 for example, is able to parse and respond to a DXL message DOWNLOAD_UPDATES by requesting bulk reputation updates. In one embodiment, the message requesting malware updates may itself be a DXL message. In some cases, for example where the updates are large and are not needed in real-time, delivery of the updates may be completed outside of the DXL architecture to reserve a DXL for lightweight, high-speed messaging.

DXL endpoint 120 may also know that it should parse and respond to MAINT: DOWNLOAD_UPDATES by contacting a vendor's servers and requesting updates.

In the case where domain master 160 is configured as the master for the reputation domain, it may know to ignore all DXL messages that are not in the MALWARE namespace. Note, however that a single physical device may be configured to act as a domain master for multiple domains, in which case traffic in different namespaces may be passed to different subroutines. In some embodiments, DXL broker 110 may be configured to synthesize reports from a plurality of DXL network devices such as DXL endpoints 120 that are given lesser privileges, such as "suggest" privileges on DXL ESB 130.

Further adding to extensibility, new or better data sources may be incorporated, by integrating them with domain master 160. This may be completely transparent to DXL endpoints 120 and other DXL endpoints.

Additional features of a DXL broker 110 may include, by way of non-limiting example: service and location registries to lookup registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain master 160 need not be concerned with how each DXL endpoint treats a published message. Rather, that can be a matter of enterprise security policy.

Additional DXL features for DXL endpoints 120 may include, by way of non-limiting example: local message bus integration, an API to discover brokers, authenticate to DXL, and send and receive catalogued messages.

Additional general features of context-aware network 100 may include, by way of non-limiting example: DXL broker and client provisioning and management of domain master 160; policy-based authorization of endpoints onto DXL ESB 130; secure SSL-based communications; proxy support for off-premises communications; and domain master appliances pre-configured with DXL broker functionality (thus joining domain master 160 and DXL broker 110 into one device).

FIG. 2 is a network diagram disclosing a DXL ESB 130 on a context aware network 100 according to one or more examples of the present Specification. In this example, DXL broker 110-1 may be designated as the "hub," while DXL broker is 110-2, 110-3, 110-4, and 110-5 may be designated as "spokes." in an example, all DXL traffic that passes through spoke will be forwarded to the hub, which will distribute the traffic to other spokes. Designation of a DXL broker 110 as the hub may be accomplished via any suitable means, such as selecting the hub based on MAC ID, IP address, or network proximity to domain master 160.

If DXL broker 110-1 goes offline, another hub may be at least temporarily needed. In that case, another have may be elected. When DXL broker 110-1 comes back online, it may resume its duties as a hub, or may act as a spoke, depending on network topology and design considerations.

In another example, spokes may form a temporary mesh network upon using effectively to DXL broker 110-1. In yet other embodiments, DXL broker is 110 may be configured to operate full time in a mesh configuration.

Additional extensibility may be provided by bridging DXL ESB 130 across disparate networks, enabling data to be exchanged over larger networks, including the Internet.

DXL brokers 110 may be configured to enhance the efficiency of DXL ESB 130. For example, each DXL broker 110 may maintain a list of subscribed topics for each connected DXL endpoint 120. The DXL broker 110 then itself subscribes to those topics. Each DXL broker 110 also maintains a list of which topics each other DXL broker 110 subscribes to. When a DXL broker 110 receives a message from any of its DXL endpoints 120, the DXL broker 110 determines which other brokers are subscribed to the topic of the DXL message, and forwards the message only to those brokers.

For example, DXL endpoint 120-42 may be an antivirus definition update server. DXL endpoints 120-52, 120-54, 120-56, 120-34, 120-36, and 120-22 may be clients that have installed on them an antivirus engine that requires antivirus updates from antivirus definition update server 120-42. Thus, clients 120-52, 120-36, and 120-22 subscribe to a topic ANTIVIRUS_DEFN_UPDATES by notifying their respective DXL brokers 110 that they wish to subscribe to that topic. DXL brokers 110-5, 110-3, and 110-2 in their turn subscribe to the topic ANTIVIRUS_DEFN_UPDATES by publishing to the other DXL brokers 110 that they are now subscribed to that topic. When antivirus definitions update server 120-42 has new updates available, it may publish a message to the ANTIVIRUS_DEFN_UPDATES topic, indicating that new antivirus updates are available. The message may also include other information, such as instructions for downloading the updates, or an expiration date indicating that after a certain time, the message should be ignored as expired.

DXL broker 110-4 receives the message from antivirus definitions update server 120-42 and looks up in its own DXL routing table that DXL brokers 110 are subscribed to the topic ANTIVIRUS_DEFN_UPDATES. DXL brokers 110-2, 110-3, and 110-5 are subscribed to this topic, so DXL broker 110-4 sends a copy of the message to each of those brokers. It does not send a copy to DXL broker 110-1, which is not subscribed to the topic.

Next, DXL brokers 110-2, 110-3, and 110-5 each distribute the message to their respective DXL endpoints that have subscribed to the topic. Advantageously, network bandwidth is saved. For antivirus definitions update server 120-42 to notify each client individually, it would have had to send out six individual copies of the message (one to each subscribed client). But in this case, only three copies are sent over the DXL ESB 130 fabric, and the DXL brokers 110 then distribute the copies locally as necessary. This reduces overall bandwidth requirement for DXL ESB 130.

Figure 3:
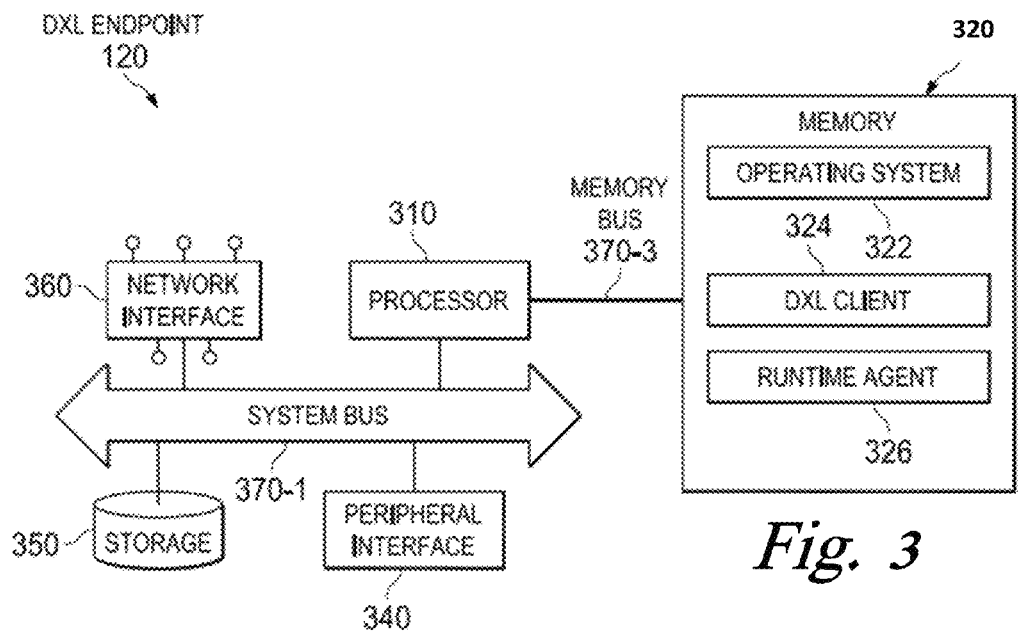
FIG. 3 is a block diagram of a DXL endpoint according to one or more examples of the present Specification.

FIG. 3 is a block diagram of client device 120 according to one or more examples of the present Specification. Client device 120 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data Client device 120 includes a processor 310 connected to a memory 320, having stored therein executable instructions for providing an operating system 322 and DXL client 324. Other components of client device 120 include a storage 350, network interface 360, and peripheral interface 340.

In an example, processor 310 is communicatively coupled to memory 320 via memory bus 370-3, which may be for example a direct memory access (DMA) bus by way of example, though other memory architectures are possible, including ones in which memory 320 communicates with processor 310 via system bus 370-1 or some other bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 350 may comprise a relatively higher-latency non-volatile memory. However, memory 320 and storage 350 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 350 may be any species of memory 320, or may be a separate device, such as a hard drive, solid-state drive, external storage, redundant array of independent disks (RAID), network-attached storage, optical storage, tape drive, backup system, cloud storage, or any combination of the foregoing. Storage 350 may be, or may include therein, a database or databases or data stored in other configurations, and may include a stored copy of operational software such as operating system 322 and software portions of DXL client 324. Many other configurations are also possible, and are intended to be encompassed within the broad scope of this Specification.

Network interface 360 may be provided to communicatively couple client device 120 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Network interface 360 may be configured to communicatively couple client device 120 to a DXL broker 110.

A DXL client engine 324 may be provided, which may provide the necessary APIs and services for connecting to DXL ESB 130.

In some cases, a runtime agent 326 may also be provided, which may similarly be any suitable combination of hardware, software and/or firmware across one or more devices. Runtime agent 326 may be configured to provide additional or auxiliary services, such as anti-malware services, or may provide reporting functions for use with DXL ESB 130. In one example, runtime agent 326 may be similar to the McAfee® Agent (MA) software provided by McAfee, Inc.

DXL client engine 324 and runtime agent 326 are examples of "engines." As used throughout this agent, an "engine" includes one or more logic elements, including hardware software, and/or firmware, configured to perform or operable for performing the function of the engine. An engine may be self-contained on a single device, or may span multiple devices. Furthermore, a single device may include a plurality of engines. For ease of discussion, the engines disclosed herein are shown, by way of example only, as a software subroutine running from memory. In one example, an engine is a utility or program that provides its host device with the necessary APIs and interfaces for performing a particular function. An engine may be, in other examples, embodied in hardware, software, firmware, or some combination thereof. For example, in some cases, an engine may include a special integrated circuit designed to carry out a method or a part thereof, and may also include software instructions operable to instruct a processor to perform the method. In some cases, the engine may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In other examples, an engine may include other hardware and software, including interactive or user-mode software, which may be provided in conjunction with, in addition to, or instead of the engine to perform methods according to this Specification.

In one example, an engine comprises executable instructions stored on a non-transitory computer-readable medium operable, when executed, for performing the methods of the engine. At an appropriate time, such as upon booting the host device, or upon a command from an operating system or a user, the processor may retrieve from storage a copy of the engine load it into memory. The processor may then iteratively execute the instructions of the engine.

Peripheral interface 340 may be configured to interface with any auxiliary device that connects to client device 120 but that is not necessarily a part of the core architecture of client device 120. A peripheral may be operable to provide extended functionality to client device 120, and may or may not be wholly dependent on client device 120. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 4:
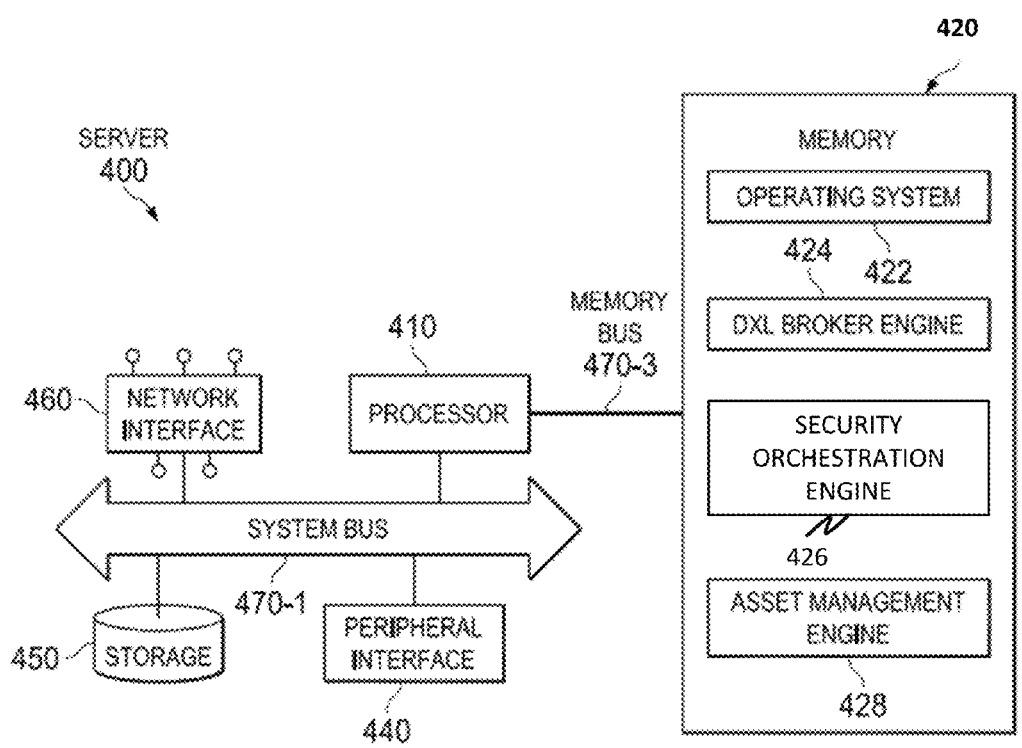
FIG. 4 is a block diagram of a server according to one or more examples of the present Specification.

FIG. 4 is a block diagram of a server 400 according to one or more examples of the present Specification. Server 400 may be any suitable computing device, as described in connection with FIG. 3. In general, the definitions and examples of FIG. 3 may be considered as equally applicable to FIG. 3, unless specifically stated otherwise. However, a server 400 may usefully and conceptually be used to refer to a class of computing devices that provide server functions in client-server architectures. Thus, in certain embodiments, domain masters 160, DSC 180, DXL broker 110, and other devices described herein may all be various embodiments of servers 400. They are discussed here together for purposes of clarity, and because servers 400 may share many common elements.

DXL broker 110 includes a processor 410 connected to a memory 420, having stored therein executable instructions for providing an operating system 422 and DXL broker engine 424. Other components of DXL broker 110 include a storage 450, network interface 460, and peripheral interface 440.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3. To simplify this disclosure, memory 420 is disclosed as a single logical block, but in a physical embodiment may include one or more blocks of any suitable volatile or non-volatile memory technology or technologies, as described in connection with memory 320 of FIG. 3. In certain embodiments, memory 420 may comprise a relatively low-latency volatile main memory, while storage 450 may comprise a relatively higher-latency non-volatile memory. However, memory 420 and storage 450 need not be physically separate devices, as further described in connection with FIG. 3

Storage 450 may be any species of memory 420, or may be a separate device, as described in connection with storage 350 of FIG. 3. Storage 450 may be, or may include therein, a database or databases or data stored in other configurations, and may include a stored copy of operational software such as operating system 422 and software portions of DXL broker engine 424. Many other configurations are also possible, and are intended to be encompassed within the broad scope of this Specification.

Network interface 460 may be provided to communicatively couple DXL broker 110 to a wired or wireless network. In one example, network interface 460 provides a plurality of logical interfaces, which may include a plurality of logical interfaces on a single physical network interface, or a plurality of logical interfaces on a plurality of physical network interfaces, a single logical network interface on a plurality of physical network interfaces, or any combination thereof. In one example, a first logical network interface is configured to communicatively couple DXL broker 110 to DXL ESB 130, including to other DXL brokers 110 on DXL ESB 130. A second logical interface may be configured to communicatively couple DXL broker 110 to a plurality of DXL endpoint devices such as DXL clients 110.

Memory 420 may include, all or part of domain security engine 424, DXL services engine 426, and/or a runtime agent 326. Each may be an engine, as described in connection with FIG. 3.

DXL broker engine 424 may be operable for providing the security methods described in this Specification. In one example, domain security engine 424 is operable to subscribe to a security DXL topic, and to receive security-related DXL messages. Domain security engine 424 may act on those messages according to methods described herein. Domain security engine may also be configured to act as a security information and event manager (SIEM) apparatus. In the SIEM role, domain security engine may provide services such as comparing data collected by a variety of security devices, applications and data sources, including one or more DXL endpoints 120. A SIEM may pool routers, switches, and virtual machines (VMs) and then normalize the data. Data may thus be standardized and synthesized. A SIEM may also be categorize data, detecting for example a "login" event regardless of the host operating system.

DXL broker engine 424 may also be configured to detect and act on or mitigate security events. A "security event" includes any event on a network that indicates a breach or intended breach of a security policy, represents a security threat, provides a security aperture, or indicates a change in security policy.

Security orchestration engine 426 may be provided to provide the necessary APIs and services to enable a server 400 to provide the security orchestration system and methods of this specification, including those functions described in connection with FIGS. 6 and 7.

Peripheral interface 440 may be configured to interface with any auxiliary device that connects to DXL broker 110 but that is not necessarily a part of the core architecture of DXL broker 110. A peripheral may be operable to provide extended functionality to DXL broker 110, and may or may not be wholly dependent on DXL broker 110. In some cases, a peripheral may be a computing device in its own right. Peripherals may include, by way of non-limiting examples, any of the devices discussed in connection with peripheral interface 340 of FIG. 3.

Figure 5:
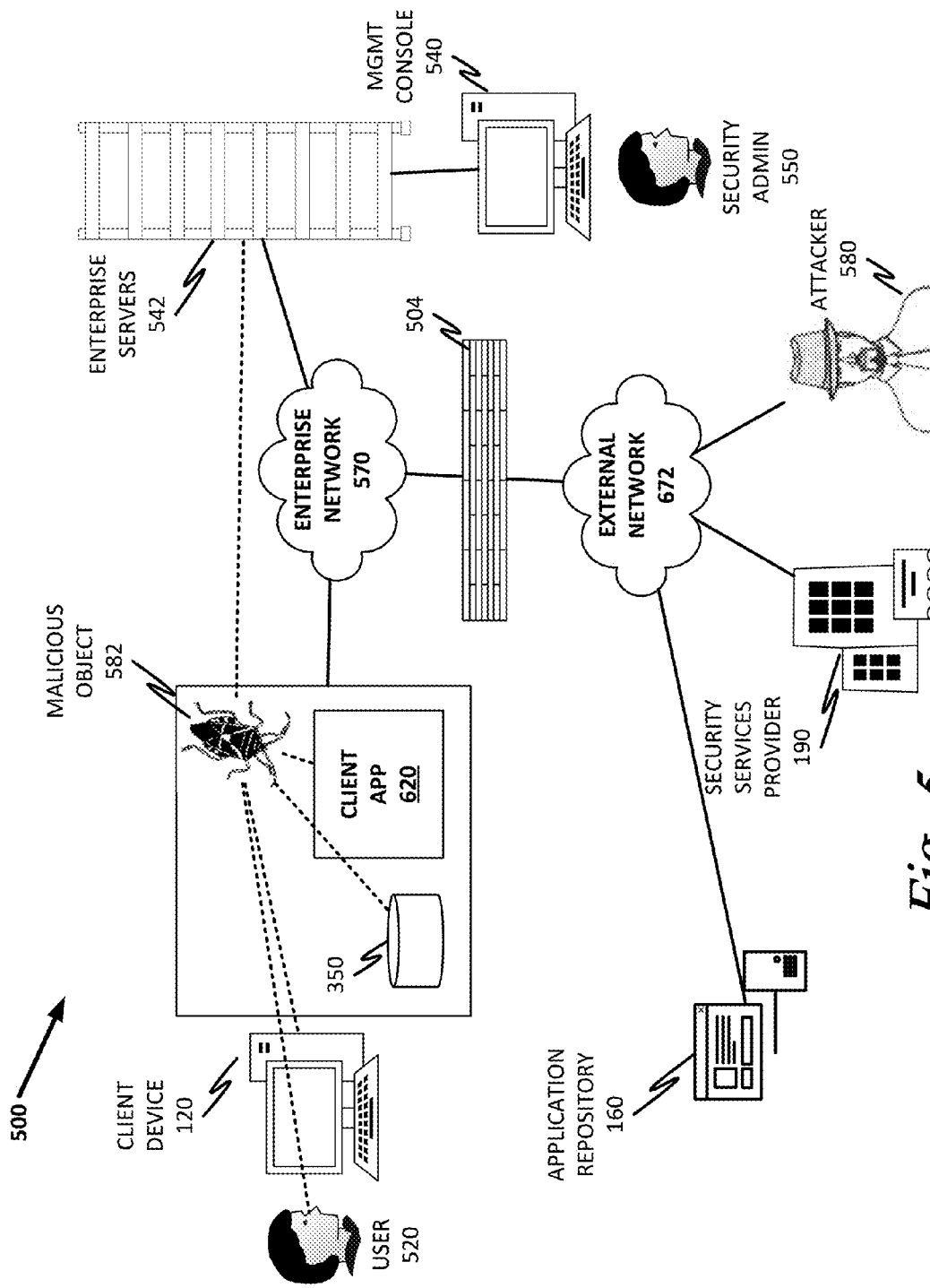
FIG. 5 is a block diagram of a DXL architecture according to one or more examples of the present Specification.

FIG. 5 is a network-level diagram of a secured enterprise 500 according to one or more examples of the present specification.

In the example of FIG. 5, one or more users 520 operate one or more client devices 120. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computes, which are usually a portable off-the-shelf device with fewer customization options, may be more likely to run Microsoft Windows or Mac OSX. Mobile devices may be more likely to run Android or iOS. However, these examples are not intended to be limiting.

Client devices 120 may be communicatively coupled to one another and to other network resources via enterprise network 570. Enterprise network 570 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 570 may also include one or more servers, firewalls, routers, switches, security appliances, antivirus servers, or other useful network devices, which in an example may be virtualized within workload cluster 542. In this illustration, enterprise network 570 is shown as a single network for simplicity, but in some embodiments, enterprise network 570 may include a large number of networks, such as one or more enterprise intranets connected to the internet. Enterprise network 570 may also provide access to an external network, such as the Internet, via external network 572. External network 572 may similarly be any suitable type of network.

A workload cluster 542 may be provided, for example as a virtual cluster running in a hypervisor on a plurality of rack-mounted blade servers, or as a cluster of physical servers. Workload cluster 542 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. It should also be noted that some functionality of endpoint devices 120 may also be provided via workload cluster 542. For example, one microcloud may provide a remote desktop hypervisor such as a Citrix workspace, which allows users 520 operating endpoints 120 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

One or more computing devices configured as a management console 540 may also operate on enterprise network 570. Management console 540 may provide a user interface for a security administrator 550 to define enterprise security policies, which management console 540 may enforce on enterprise network 570 and across client devices 120 and workload cluster 542. In an example, management console 540 may run a server-class operating system, such as Linux, Unix, or Windows Server. In other case, management console 540 may be provided as a web interface, on a desktop-class machine, or via a VM provisioned within workload cluster 542.

Secured enterprise 500 may encounter a variety of "security objects" on the network. A security object may be any object that operates on or interacts with enterprise network 570 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 120 by way of non-limiting example.

Secure enterprise 500 may communicate across enterprise boundary 504 with external network 572. Enterprise boundary 504 may represent a physical, logical, or other boundary. External network 572 may include, for example, websites, servers, network protocols, and other network-based services. In one example, an application repository 560 is available via external network 572, and an attacker 580 (or other similar malicious or negligent actor) also connects to external network 572. A security services provider 590 may provide services to secured enterprise 100.

It may be a goal of users 520 and secure enterprise 100 to successfully operate client devices 120 and workload cluster 542 without interference from attacker 580 or from unwanted security objects. In one example, attacker 580 is a malware author whose goal or purpose is to cause malicious harm or mischief, for example by injecting malicious object 582 into client device 120. Once malicious object 582 gains access to client device 120, it may try to perform work such as social engineering of user 520, a hardware-based attack on client device 120, modifying storage 350, modifying client application 520 (which may be running in memory), or gaining access to enterprise servers 542.

The malicious harm or mischief may take the form of installing root kits or other malware on client devices 120 to tamper with the system, installing spyware or adware to collect personal and commercial data, defacing websites, operating a botnet such as a spam server, or simply to annoy and harass users 520. Thus, one aim of attacker 580 may be to install his malware on one or more client devices 120. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 580 may also want to commit industrial or other espionage against secured enterprise 500, such as stealing classified or proprietary data, stealing identities, or gaining unauthorized access to enterprise resources. Thus, attacker 580's strategy may also include trying to gain physical access to one or more client devices 120 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 560 may inadvertently provide attack vectors for attacker 580. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 560 may represent a Windows or Apple "app store" or update service, a Unix-like repository or ports collection, or other network service providing users 520 the ability to interactively or automatically download and install applications on client devices 120. If application repository 560 has security measures in place that make it difficult for attacker 580 to distribute overtly malicious software, attacker 580 may instead stealthily insert vulnerabilities into apparently-beneficial applications.

In some cases, secured enterprise 100 may provide policy directives that restrict the types of applications that can be installed from application repository 560. Thus, application repository 560 may include software that is not negligently developed and is not malware, but that is nevertheless against policy. For example, some enterprises restrict installation of entertainment software like media players and games. Thus, even a secure media player or game may be unsuitable for an enterprise computer. Security administrator 550 may be responsible for distributing a computing policy consistent with such restrictions and enforcing it on client devices 520.

Secured enterprise 100 may also contract with or subscribe to a security services provider 590, which may provide security services, updates, antivirus definitions, patches, products, and services. McAfee®, Inc. is a non-limiting example of such a security services provider that offers comprehensive security and antivirus solutions. In some cases, security services provider 590 may include a threat intelligence capability such as the global threat intelligence (GTI™) database provided by McAfee Inc. Security services provider 590 may update its threat intelligence database by analyzing new candidate malicious objects as they appear on client networks and characterizing them as malicious or benign.

In another example, secured enterprise 500 may simply be a family, with parents assuming the role of security administrator 550. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 550.

Collectively, any object that is or can be designated as belonging to any of the foregoing classes of undesirable objects may be classified as a malicious object. When an unknown object is encountered within secured enterprise 500, it may be initially classified as a "candidate malicious object." This designation may be to ensure that it is not granted full network privileges until the object is further analyzed. Thus, it is a goal of users 520 and security administrator 550 to configure and operate client devices 120, workload cluster 542, and enterprise network 570 so as to exclude all malicious objects, and to promptly and accurately classify candidate malicious objects.

Figure 6:
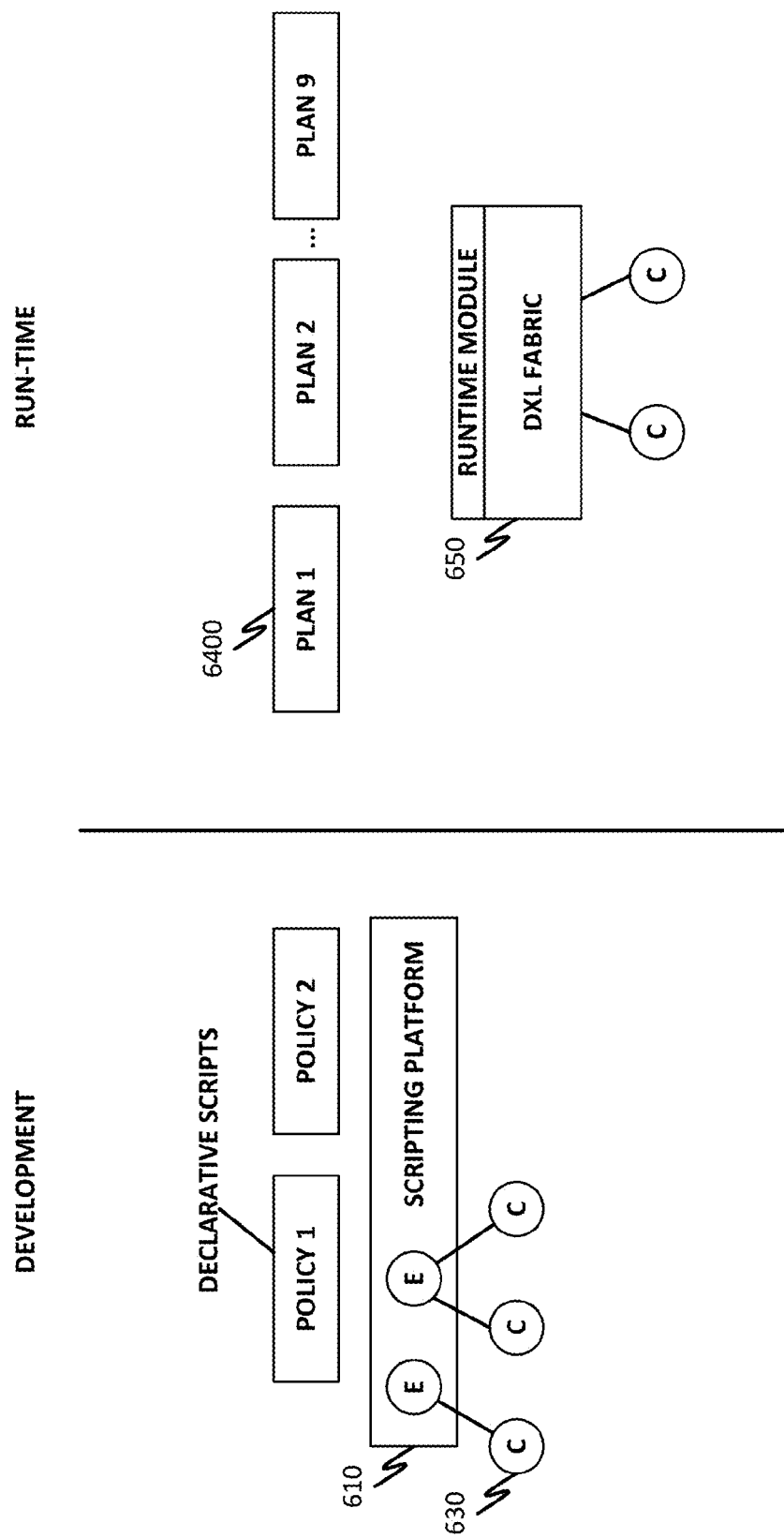
FIG. 6 is a block diagram of a secured enterprise according to one or more examples of the present specification.

FIG. 6 discloses a block diagram of an orchestration framework. At a high level, the orchestration framework works as follows:

a. Given a user-specified security policy specification (as first input) and information about the types of controls available in the environment (as second input), a specialized algorithm compiles the policy into an execution plan. The plan describes an optimal sequence in which individual functions of appropriate controls need to be invoked, along with the policy-specific, decision logic.

b. Subsequently the policy (plan) is deployed in a target environment. A centralized controller (runtime) orchestrates the policy's execution by invoking the respective control functions in the right sequence in real-time to identify matching activities, evaluate the policy decision logic, and drive enforcement actions when needed.

In an example, elements include:

a. Scripting platform 610, which enables users to declaratively specify policies.

b. Participating security controls 630 provide a capability specification and standardized plug-ins.

c. Execution plans 640 (state machine specific) are compiled from scripts.

d. A runtime orchestration module 650 executes the plan.

FIG. 6 illustrates an embodiment of this framework as follows. It should be noted that the following embodiment is provided by way of example only, and is not intended to be limiting in any way.

a. A context-aware policy takes the form of a rule: [activity/context/command]. Here, the activity context describes the details of the target scenario, and the command describes the desired (security) action associated with it. A command may be either a one-time action, or a stateful policy to be applied only as long as the context holds true.

b. Policy rules are specified using a declarative (domain-specific) scripting language:

i. The language's vocabulary for specifying context is based on the ontology of business activity. For example, the ontology for OS and network activity includes entities (such as files, processes and TCP connections), their properties and inter-relationships, and operations. A particular context can be represented a logical proposition over this ontology. For example, one such context might be a process with: image_file.path='c:\abc.exe' ii. This creates a TCP connection to a service at IP address=1.2. 3.4 and port=443.

iii. The vocabulary for specifying commands is based on related enforcement actions. For example, block the TCP connection, or terminate the process, seek two-factor authentication of the user, or encrypt the files.

c. Participating controls declare their sensing and enforcement capabilities to the framework via a control specification. Each type of control (e.g. file- & process-monitor, a network-monitor, HTTP session monitor, and geo-fence sensor) has its own specification. Each control-capability maps to a specific element of the language vocabulary (e.g., file and process control may declare that it can sense (as context) a file's path, and file creation and execution events, and also (as a command) prevent a file from being executed. The specifications are provided a priori by developers or integrators of the controls.

d. Developers or integrators also implement a standardized plug-in interface that allows the control's declared capabilities to be invoked at run-time. This interface is the same across all types of controls. In summary, new and arbitrary controls may be easily incorporated into the system (and potentially enhance its capabilities) simply by declaring a specification and implementing a standardized plug-in.

e. Given a user-defined (declarative) policy script, a compiler leverages the available control information, and translates the script into an optimized execution plan in the form of a procedural state machine specification. If multiple controls with the same capability are available, the plan intelligently selects one with the lowest overall cost.

i. For example, the execution plan for the sample context described above might (i) leverage a file & process monitor to detect the execution of a file with: path='c:\abc.exe' ii. Obtain its process ID, and then (ii) leverage a network monitor to detect a TCP connection by that process to the remote
IP_address=1.2.3.4; port=443 iii. Note that these controls may work independently but collaboratively to sense the context by virtue of the orchestration framework.

f. All of the above steps may occur before deployment. Upon deployment, available controls register themselves with the nearest runtime module via their plug-ins. The runtime module then orchestrates policy execution plans given to it, driving appropriate controls to sense the desired activity contexts and execute the commands (in those contexts). To do so, it maintains a state-machine instance for each such context.

Figure 7:
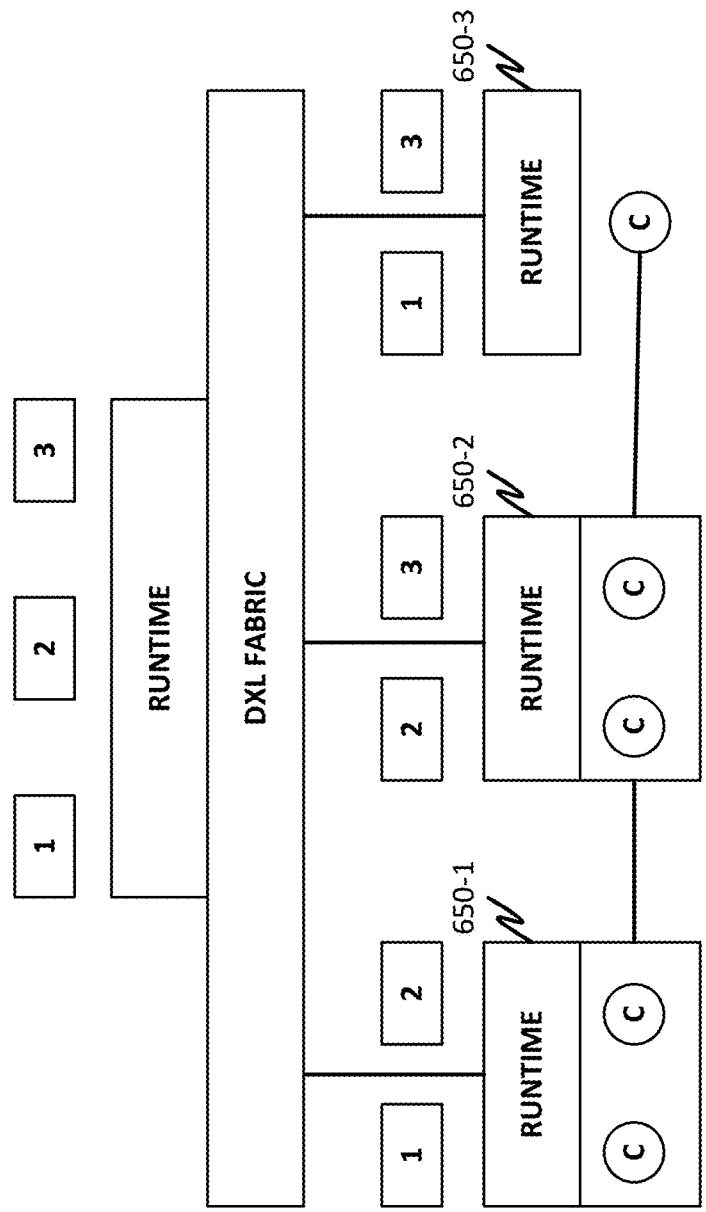
FIG. 7 is a block diagram of selected aspects of a security orchestration framework according to one or more examples of the present specification.

FIG. 7 is a block diagram of distributed deployment according to one or more examples of the present specification.

In this example, runtime module 650 can be deployed hierarchically on endpoints, and at the confluence of relevant controls on the network. This enables distributed real-tune correlation and minimizes network communication.

In this embodiment, multiple instances of runtime module 650 (namely, 650-1, 650-2, and 650-3) are deployed across the network to form a hierarchy. For example, a runtime module may reside on every endpoint 120. Policy execution plans are broken down as necessary and pushed down to the lowest level in the hierarchy to improve performance and minimize network communication.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, a computing apparatus, comprising: a network interface; one or more logic elements comprising a security orchestration server engine operable for: receiving contextual data from a client via the network interface; providing the contextual data to a security orchestration state machine, the security orchestration state machine operable for deriving a policy decision from the contextual data; and receiving the policy decision from the policy orchestration state machine.

There is further disclosed an example wherein the security orchestration server engine is further operable for enforcing the policy decision.

There is further disclosed an example wherein enforcing the policy decision comprises sending an enforcement message to the client.

There is further disclosed an example wherein the enforcement message is a data exchange layer (DXL) message.

There is further disclosed an example wherein sending the enforcement message to the client comprises sending the message via an application programming interface (API), wherein the API is agnostic of implementation of the enforcement on the client.

There is further disclosed an example wherein enforcing the policy decision comprises jointly enforcing the policy with a second device.

There is further disclosed an example wherein deriving a policy decision from the contextual data comprises receiving a policy objective comprising a result-oriented declaration of the policy decision.

There is further disclosed an example wherein receiving contextual data from the client via the network interface comprises receiving the contextual data via an application programming interface (API), wherein the API is agnostic of implementation of the contextual data.

There is further disclosed an example wherein the network interface is a data exchange layer (DXL) interface.

There is further disclosed an example wherein receiving contextual data comprises receiving a DXL message.

There is further disclosed an example comprising a method of performing any or all of the operations disclosed in any of the preceding examples.

There is further disclosed an example of one or more tangible, non-transitory computer-readable storage mediums having stored thereon executable instructions for instructing one or more processors for providing a security orchestration engine operable for performing any or all of the operations of the preceding examples.

There is further disclosed an example of a method of providing a security orchestration engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
a network interface to communicatively couple the apparatus to an enterprise service bus (ESB);
one or more logic elements comprising a security orchestration server engine operable for:
receiving contextual data from a client via the ESB;
providing the contextual data to a security orchestration state machine, the security orchestration state machine operable for deriving a policy decision from the contextual data; and
receiving the policy decision from the policy orchestration state machine.

2. The computing apparatus of claim 1, wherein the security orchestration server engine is further operable for enforcing the policy decision.

3. The computing apparatus of claim 2, wherein enforcing the policy decision comprises sending an enforcement message to the client via the ESB.

4. The computing apparatus of claim 1, wherein the ESB is a data exchange layer (DXL).

5. The computing apparatus of claim 3, wherein sending the enforcement message to the client comprises sending the message via an application programming interface (API), wherein the API is agnostic of implementation of the enforcement on the client.

6. The computing apparatus of claim 2, wherein enforcing the policy decision comprises jointly enforcing the policy with a second device.

7. The computing apparatus of claim 1, wherein deriving a policy decision from the contextual data comprises receiving a policy objective comprising a result-oriented declaration of the policy decision.

8. The computing apparatus of claim 1, wherein receiving contextual data from the client via the network interface comprises receiving the contextual data via an application programming interface (API), wherein the API is agnostic of implementation of the contextual data.

9. The computing apparatus of claim 1, wherein the network interface is a data exchange layer (DXL) interface.

10. The apparatus of claim 9, wherein receiving contextual data comprises receiving a DXL message.

11. One or more tangible, non-transitory computer-readable storage mediums having stored thereon executable instructions for providing a security orchestration server engine operable for:
receiving contextual data from a client via an enterprise service bus (ESB);
providing the contextual data to a security orchestration state machine, the security orchestration state machine operable for deriving a policy decision from the contextual data; and
receiving the policy decision from the policy orchestration state machine.

12. The one or more tangible, non-transitory computer-readable storage mediums of claim 11, wherein the security orchestration server engine is further operable for enforcing the policy decision.

13. The one or more tangible, non-transitory computer-readable storage mediums of claim 12, wherein enforcing the policy decision comprises sending an enforcement message to the client.

14. The one or more tangible, non-transitory computer-readable storage mediums of claim 13, wherein the enforcement message is a data exchange layer (DXL) message.

15. The one or more tangible, non-transitory computer-readable storage mediums of claim 13, wherein sending the enforcement message to the client comprises sending the message via an application programming interface (API), wherein the API is agnostic of implementation of the enforcement on the client.

16. The one or more tangible, non-transitory computer-readable storage mediums of claim 12, wherein enforcing the policy decision comprises jointly enforcing the policy with a second device.

17. The one or more tangible, non-transitory computer-readable storage mediums of claim 11, wherein deriving a policy decision from the contextual data comprises receiving a policy objective comprising a result-oriented declaration of the policy decision.

18. The one or more tangible, non-transitory computer-readable storage mediums of claim 11, wherein receiving contextual data from the client via the ESB comprises receiving the contextual data via an application programming interface (API), wherein the API is agnostic of implementation of the contextual data.

19. The one or more tangible, non-transitory computer-readable storage mediums of claim 11, wherein the ESB is a data exchange layer (DXL) interface.

20. The one or more tangible, non-transitory computer-readable storage mediums of claim 11, wherein receiving contextual data comprises receiving a DXL message.

* * * * *